(12) United States Patent  
Counts et al.

(10) Patent No.: US 8,780,230 B2  
(45) Date of Patent: Jul. 15, 2014

(54) FAUX GROUP IMAGE AND METHOD

(75) Inventors: Jack Counts, Oklahoma City, OK (US);  
Bob Porter, Oklahoma City, OK (US);  
Mike Melton, Oklahoma City, OK (US);  
Bo Lewis, Oklahoma City, OK (US)

(73) Assignee: Candid Color Systems, Inc., Oklahoma City, OK (US)

( * ) Notice: Subject to any disclaimer, the term of this patent is extended or adjusted under 35 U.S.C. 154(b) by 155 days.

(21) Appl. No.: 13/035,677

(22) Filed: Feb. 25, 2011

(65) Prior Publication Data

US 2012/0218441 A1 Aug. 30, 2012

(51) Int. Cl.
*H04N 5/262* (2006.01)
*H04N 5/76* (2006.01)
*H04N 5/222* (2006.01)
*H04N 9/74* (2006.01)
*H04N 9/00* (2006.01)

(52) U.S. Cl.
USPC ............... 348/239; 348/231.2; 348/231.5; 348/333.01; 348/586; 382/118

(58) Field of Classification Search
CPC .. H04N 5/272; H04N 5/23293; H04N 9/8205
USPC ......... 348/239, 231.2, 223.5, 333.01, 333.02, 348/584, 586, 592, 231.5; 382/282, 284, 382/450, 294, 118
See application file for complete search history.

(56) References Cited

U.S. PATENT DOCUMENTS

| | | |
|---|---|---|
| 7,039,869 B2 | 5/2006 | Smith |
| 2006/0050086 A1* | 3/2006 | Ono .............................. 345/629 |
| 2006/0078173 A1* | 4/2006 | Isomura et al. ............... 382/118 |
| 2008/0080745 A1* | 4/2008 | Vanhoucke et al. .......... 382/118 |
| 2008/0246777 A1 | 10/2008 | Swanson et al. |
| 2009/0087123 A1* | 4/2009 | Izawa et al. ................... 382/284 |
| 2009/0167870 A1 | 7/2009 | Caleca |
| 2010/0073506 A1* | 3/2010 | Uehara et al. ............... 348/222.1 |
| 2010/0086278 A1 | 4/2010 | Stankiewicz et al. |
| 2012/0098999 A1* | 4/2012 | Chen ........................... 348/231.5 |

* cited by examiner

*Primary Examiner* — Nhan T Tran
(74) *Attorney, Agent, or Firm* — McAfee & Taft (57) ABSTRACT

A method to create a faux group by using at least one digital image combined with at least one other digital image is provided. Associated with each digital image is data that is linked, which identifies the image and biographical data elements associated with the subject appearing in the image. From the digital images and linked data, a faux group image is created. On the faux group image, biographical data elements such as names or other identifiers are optionally displayed. If displayed, each biographical data element is linked to the associated individual digital image in the order it appears. Any rearrangement, movement or adjustment to either the digital image or associated biographical data element in the faux group image causes the digital image and biographical data element to be updated relative to all of the other digital images and biographical data element in the order that the subject of each individual digital image appears. The faux group is arranged by a matrix that establishes the rows and columns of images, or arranges the digital images. The digital images are automatically and proportionally sized relative to the digital images around them within the faux group image. This creates a natural appearance.

54 Claims, 9 Drawing Sheets

1st ROW: KAY, JON, KURT, ANN
2nd ROW: JAN, SAM, LOU, LISA
3rd ROW: BILL, ED, BOB, PAT
4th ROW: TIM, DEB, JILL. PETE

FAUX GROUP IMAGE AND METHOD

BACKGROUND

For many years, amateur and professional photographers have endeavored to take quality group photographs. Usually, group photographs are of an assembly with which an individual has an association. For larger groups or more formal groupings, professional photographers specializing in large group photos are employed. School and wedding photos are common examples of large group photos. Additionally, social organizations such as sororities and fraternities, lodges, community service groups, and other groups often desire large group photograph formats. All of these groups have a similar set of needs and challenges.

Figure 1:
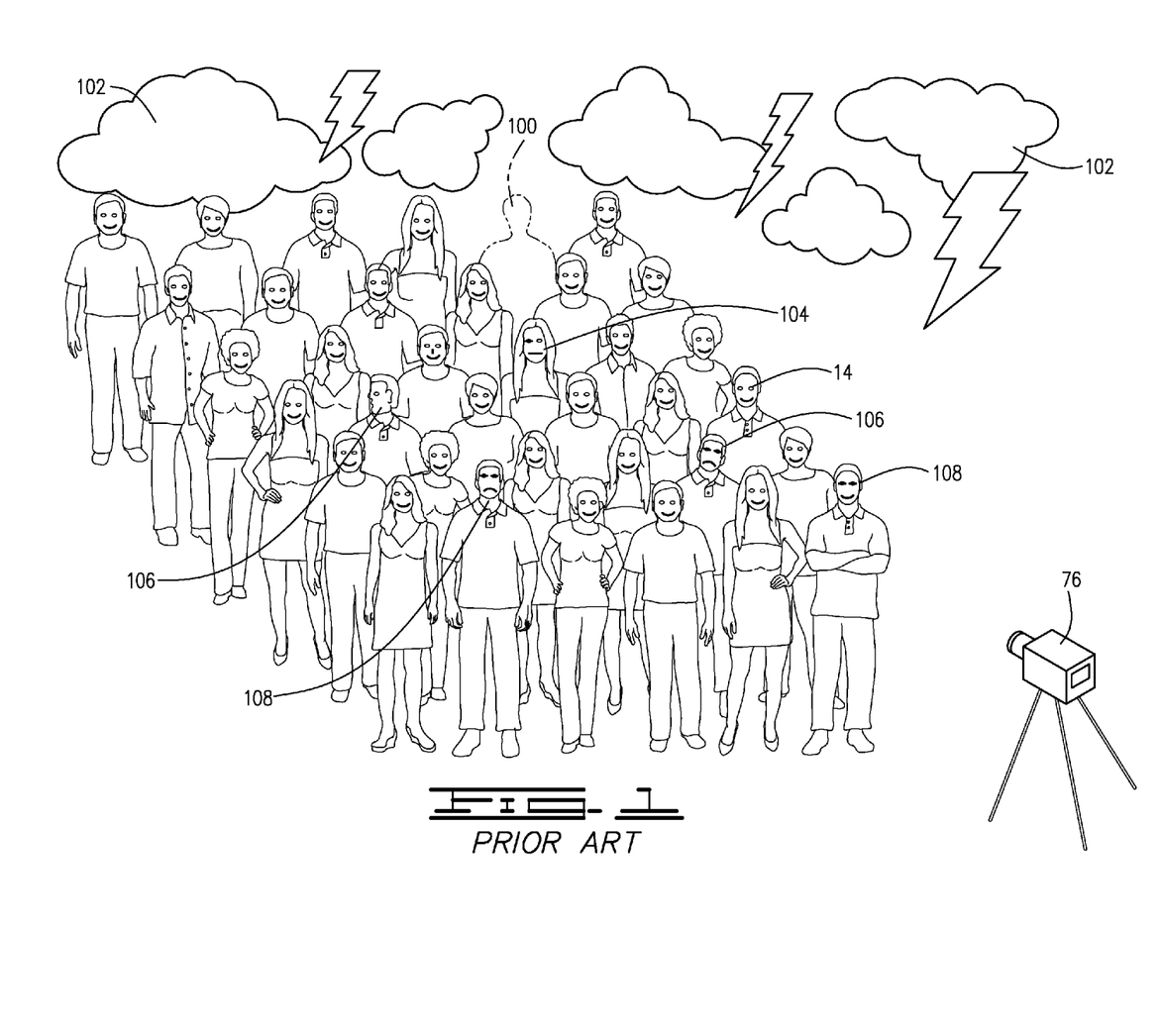
FIG. 1 is a representation of a representative illustration of a school age group image showing challenges faced when photographing group images.

One group photograph challenge requires managing cooperation among subjects. FIG. 1 illustrates some of these challenges, such as absent persons 100, bad weather 102, closed eyes 104, turned heads 106, poor placement in the group 108 and a host of other cooperative issues. Clearly, trying to coordinate a large number of people for a photo shoot requires patience, diligence and luck.

Another challenge of group photography is coordinating the names associated with each individual subject in the photo. It is common to have an incorrect name associated with a particular subject in the group photo. The biographical information related to the individual subjects in the photo are vulnerable to being recorded incorrectly, limited in the amount of information provided, illegible, or not used at all. In many group photos, the individual subjects fill out a card and provide it to the coordinator. Unfortunately, these cards are vulnerable to being shuffled, lost, damaged by the subject or not turned in. The final product may not include the right name with the right individual subject, or lead to a decision to not include names for fear of getting them wrong. Due to these limitations, it is often very difficult to create group photos based upon biographical information.

If a group photo of a subset of a larger group is desired, numerous photography sessions are required for each subset group. However, if only a single large group photo is shot, it is impossible to create another group photo based upon a subset of the aforementioned biographical information, such as the wedding party, the honor society or a team. Instead, another photo shoot is needed, which requires additional time on the part of all the individual subjects, and once again overcoming many of the same challenges.

Similarly, it is often difficult to get all of the individual subjects for a group photograph together at the same time. For example, many individuals want to send a Christmas or Holiday photo that has the entire family in it. However, it is common to have one or more family members away at the time the photo needs to be taken. Thus, only a portion of the family is in the family photo. This is true for other events such as weddings, family reunions, class reunions, composite office shots, etc.

Yet another challenge related to group photos is the ability to artistically correct the photo after the fact. For example, a subject may be tall enough to block everyone standing behind them, or the subjects line up out of order. In some instances, the subjects may be wearing similar clothing and be placed next to each other. In these instances, the photographer may wish to artistically adjust the placement of any of a number of individuals. Unfortunately, the single shot group photo does not readily facilitate such adjustments. Furthermore, any movement of the subjects within the photo after it has been shot forces extensive manual movement of the individual subject's name or biographical information.

Another problem with group photos is the input device and subsequent quality of a group photo. Currently, a group shot requires an expensive camera capable of capturing large volumes of data. The better the optical input device, the better the ultimate image will be. Thus, the input device also drives a limitation of the group photo. Accordingly, professionals having very expensive camera equipment with very expensive lenses and large format film usually shoot group photos. Currently, the cameras used for group shots are digital cameras providing large quantities of data per pixel.

Often, individuals wish to create a group photo from other photos or raw digital data. Although some software currently allows people to create such photos, it is a time-consuming, difficult task requiring the technical expertise of one having advanced skills. The cost to hire someone to create such a photo is exorbitantly expensive, and often beyond the reach of the average person. Additionally, creating such photos requires a manual positioning and sizing of individuals relative to the other individuals. This creates the challenge of extracting the image of the individual subject from the existing photo or raw digital data.

Figure 2:
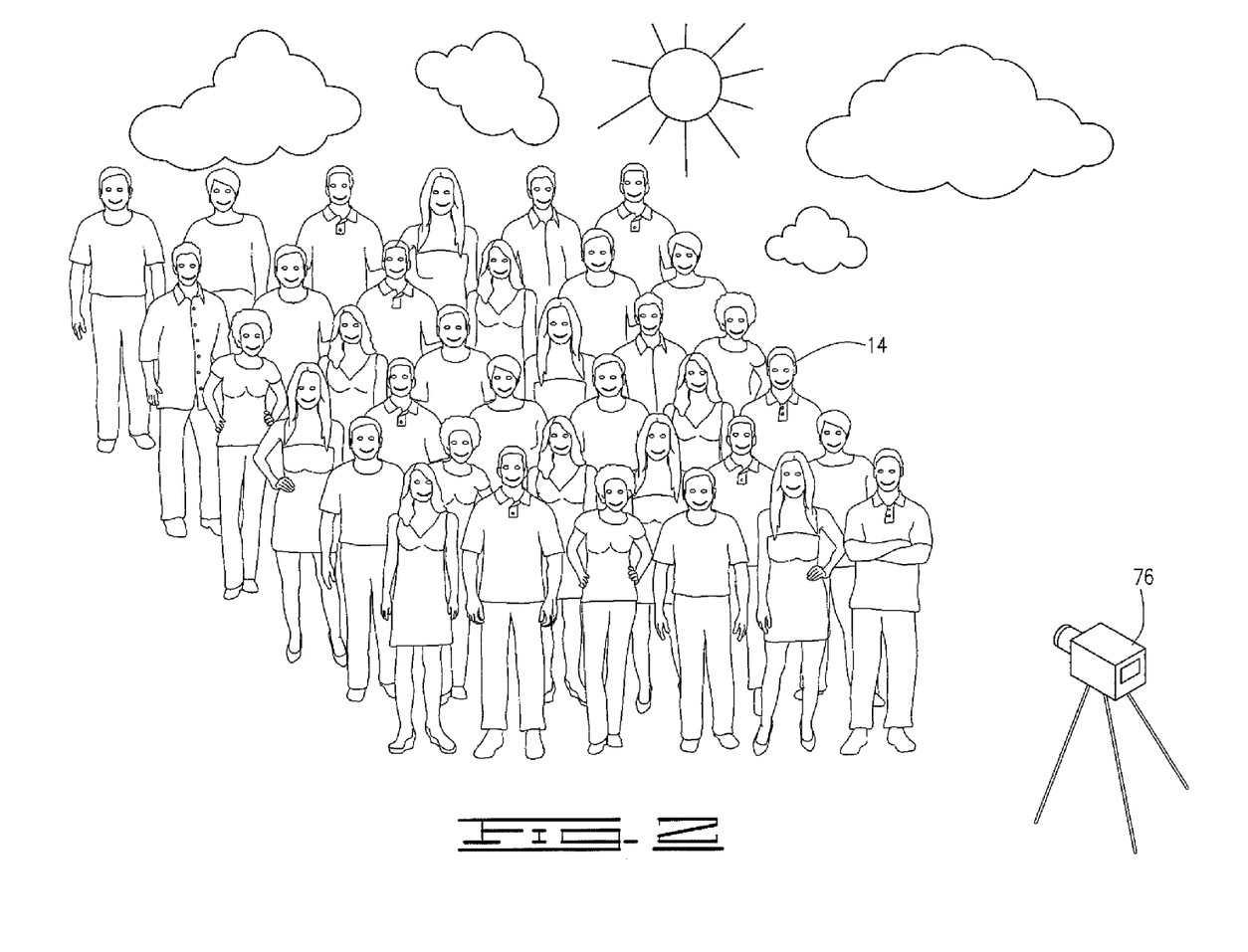
FIG. 2 is an illustration of a representative illustration of a group image without the benefit of the inventive method.

Even if each individual subject is shot and pasted into a group photo, the sizing remains an issue. FIG. 2 illustrates a perfect set of individual photos manually pasted into a group photo, but highlights the problem of sizing the individual subjects relative to each other. The back row and front rows are identically sized, yet none of the individual subjects are proportional to each other.

What is needed is a way to take group photos that does not require the entire group to be there, and captures all the information about each individual subject in the group photo, referred to hereinafter as "images." Additionally, the photographer, referred to as an "operator" hereinafter, needs an instrument to easily adjust the image without adding undue expense. Preferably, such a system will be automated and allow the operator to exert minimal input to create the final product.

SUMMARY

In accordance with the present invention, a method for creating a faux group image is provided which overcomes the deficiencies described above, and has other advantages as well.

In one embodiment, the current invention provides a method of creating a faux group image. The method comprises the steps of:
  (a) capturing at least one digital image of each of a plurality of subjects;
  (b) obtaining at least one biographical data element associated with each subject and linking the biographical data element with the associated digital image;
  (c) electronically storing each linked digital image and biographical data element;
  (d) selecting a group image format;
  (e) selecting the digital images;
  (f) selecting a background; and
  (g) automatically generating the faux group image from the selected digital images, wherein each digital image is automatically and proportionally sized relative to the other digital images based upon the position of the digital image within the faux group image.

In another embodiment, the current invention provides a method of creating a faux group image. The method comprises the steps of:
  (a) obtaining at least one biographical data element associated with each of a plurality of individual subjects;

(b) capturing at least one digital image of each of the individual subjects and linking the captured digital image with the biographical data element;
(c) electronically storing each linked digital image and biographical data element;
(d) selecting a desired group image format;
(e) automatically positioning the individual subjects in the desired group image format using at least one element of the biographical data elements;
(f) selecting a background; and
(g) automatically creating the faux group image.

In yet another embodiment, the current invention provides a method of creating a faux group image. The method comprises the steps of;
(a) capturing at least one digital image of each of a plurality of subjects;
(b) obtaining at least one biographical data element associated with each subject and linking that biographical data element with the associated digital image;
(c) electronically storing each linked digital image and biographical data element;
(d) selecting a background;
(e) automatically generating the faux group image from the selected digital images; and
(f) providing access to each subject for selection of their preferred digital image and entry of any necessary corrections to the associated biographical data elements.

BRIEF DESCRIPTION OF THE DRAWINGS

FIGS. 6 and 7 are illustrations of the creation of faux group images using the inventive method.

FIG. 8 is an illustration of a faux group image using the inventive method.

FIG. 9 is an illustration of a faux group image after adjustment using the inventive method.

DETAILED DESCRIPTION

Figure 3:
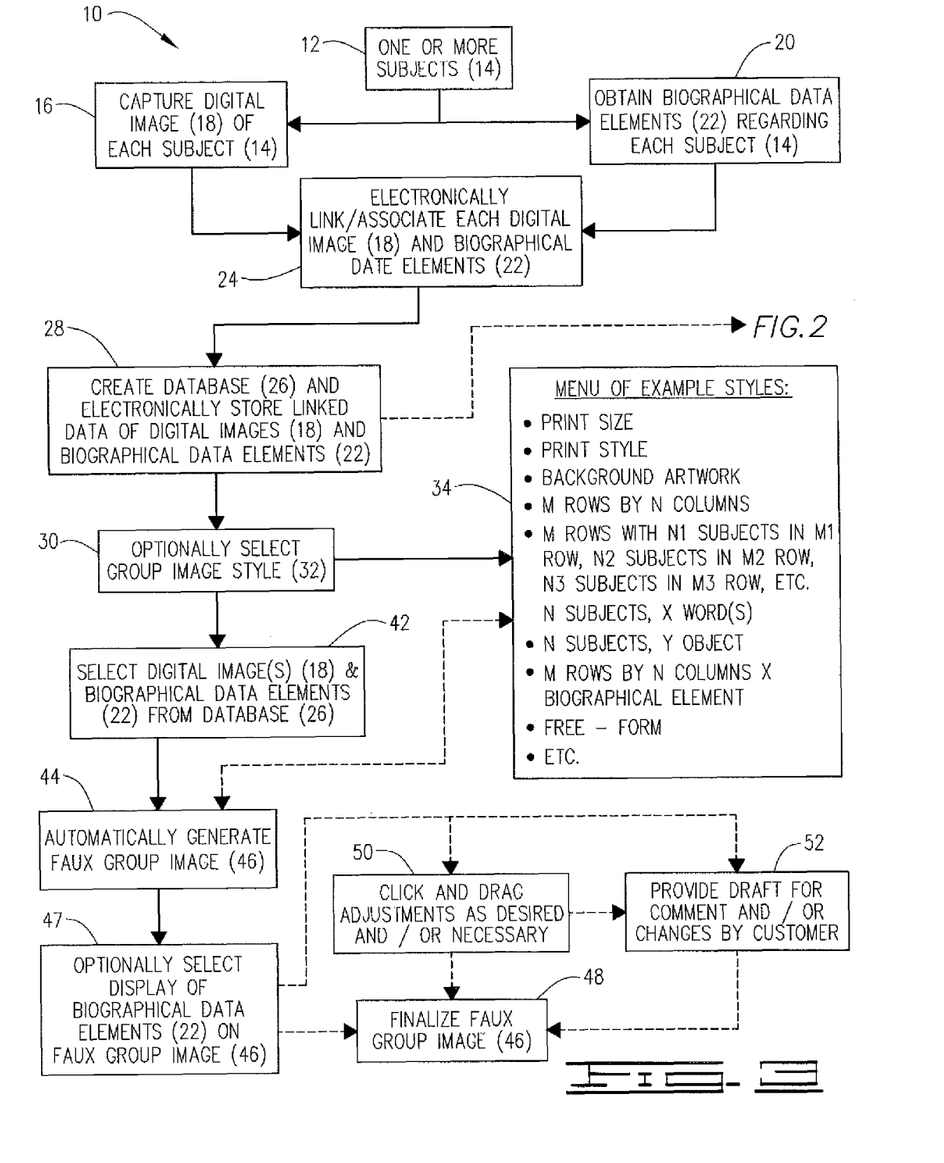
FIG. 3 is a flow chart of the inventive method.
Figure 5:
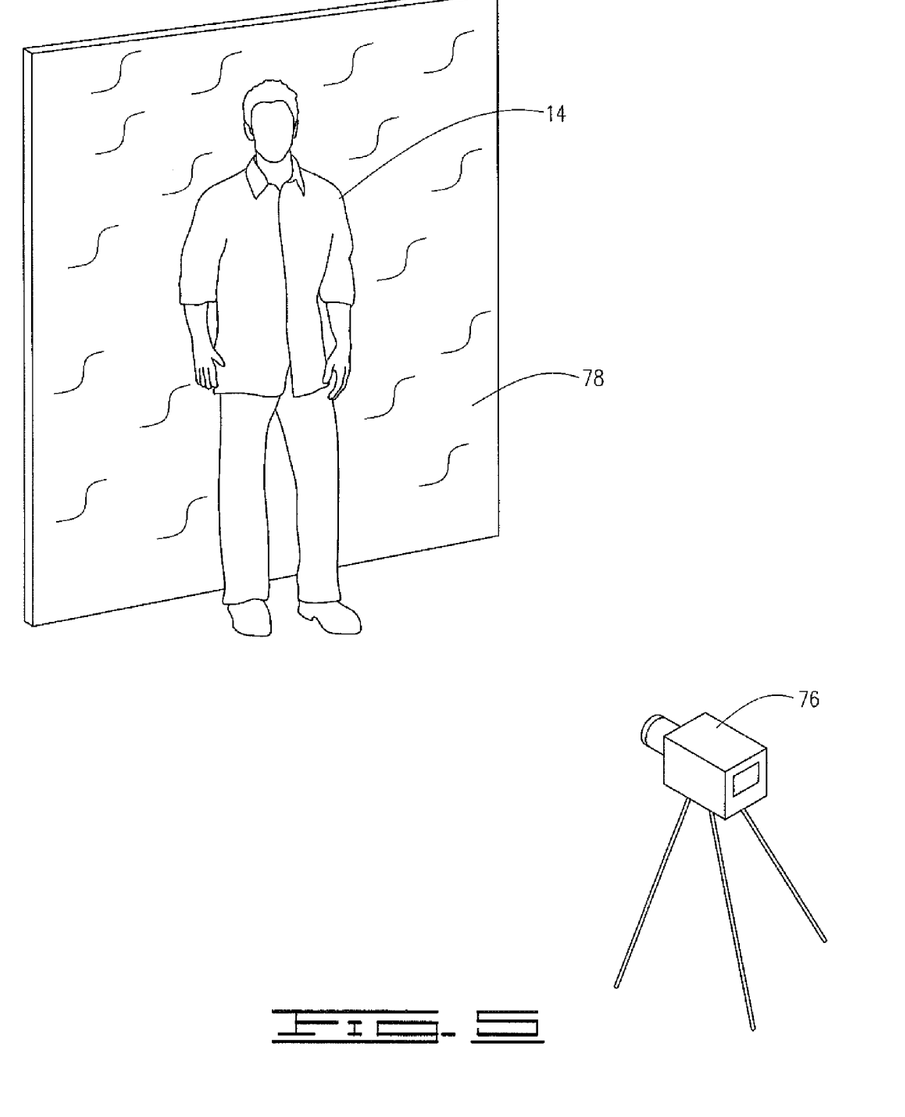
FIG. 5 is an illustration of the individual having his or her image captured.

Referring to FIG. 3, the inventive method for creating a faux group image is illustrated by flowchart 10. Step 12 of flowchart 10 illustrates obtaining a group image of one or more subjects 14. FIG. 5, illustrating step 16, provides for capturing digital image 18 of subjects 14. Before, after or contemporaneously with step 16, step 20 provides for obtaining at least one biographical data element 22 on each subject 14. Biographical data elements 22 are the dataset of personal, identifying information related to each individual subject 14. The capturing of digital image 18 and the obtaining of biographical data elements 22 are discussed in detail hereinbelow.

Following steps 16 and 20, each digital image 18 and the associated biographical data element(s) 22 are linked together in step 24. The linked data is stored in database 26 in step 28 of flowchart 10 for later retrieval and use.

Step 30 provides for the optional selection of group image style 32 used to generate the faux group image. Example styles of the faux group image are depicted in sample style menu 34 illustrated in FIG. 3 and depicted in FIGS. 6-9. Sample style menu 34 provides several representative and non-limiting examples of group image styles 32. The non-limiting examples include the basic selection of size and/or image background. Additionally, in all of the examples, placement of subject 14 in the faux group image is made by choosing one or more data elements from biographical data elements 22. The non-limiting example of a high school class photo highlights this versatility. A senior class faux group image may desire to place everyone alphabetically, except the front row may have the class officers centered within and further positioned by their office.

Another non-limiting example of the style provides the operator the option of selecting the number of rows 36 and columns 38 for the faux group image. Still another non-limiting example provides the operator the option of selecting the number of rows 36 and the number of subjects 14 on each row 36. This example allows for decreasing or increasing the numbers of subjects 14 in each row. This example also allows for subjects 14 in one row 36 to be offset from the subjects 14 in the row immediately in front.

Figure 7:
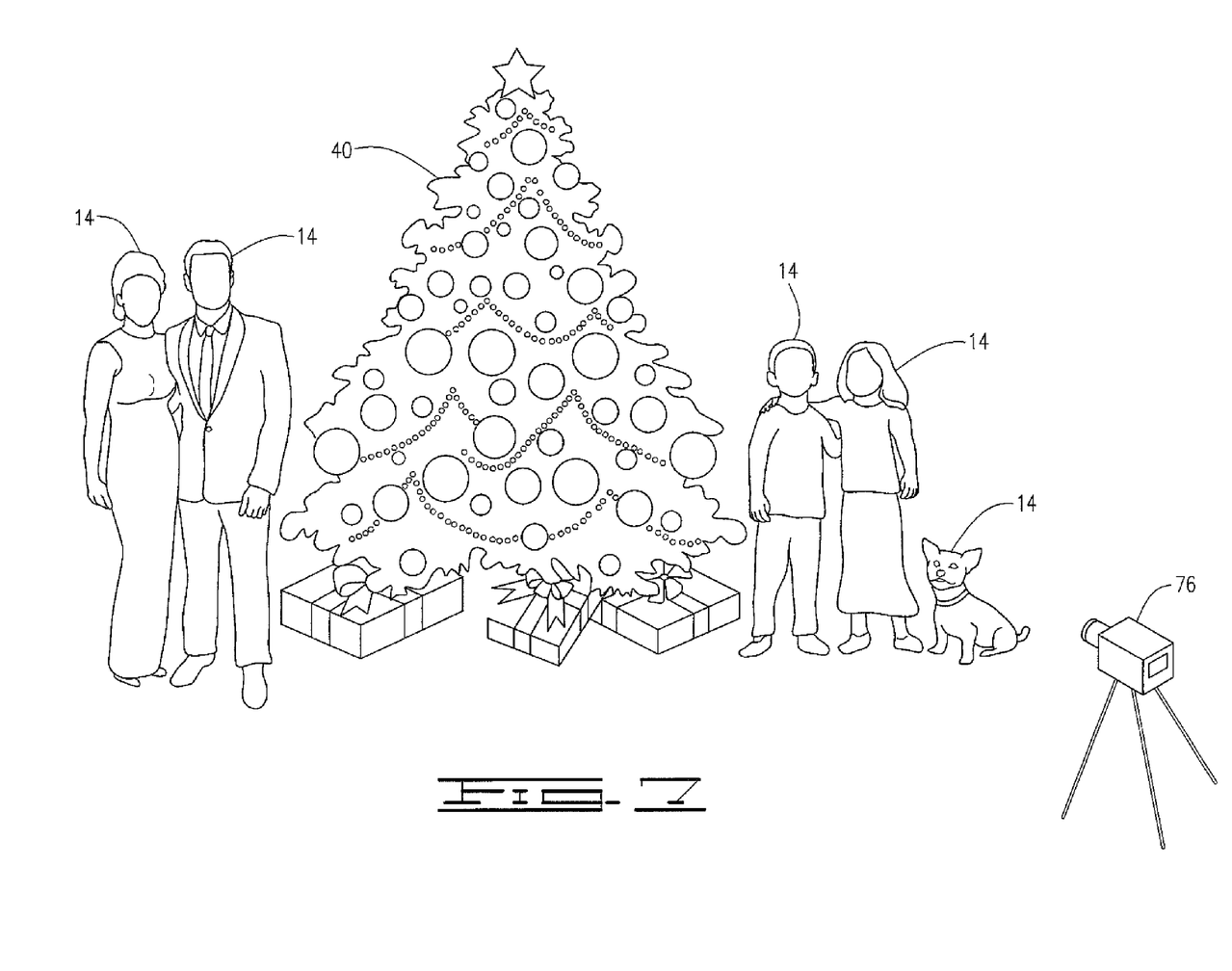
Figure 11:
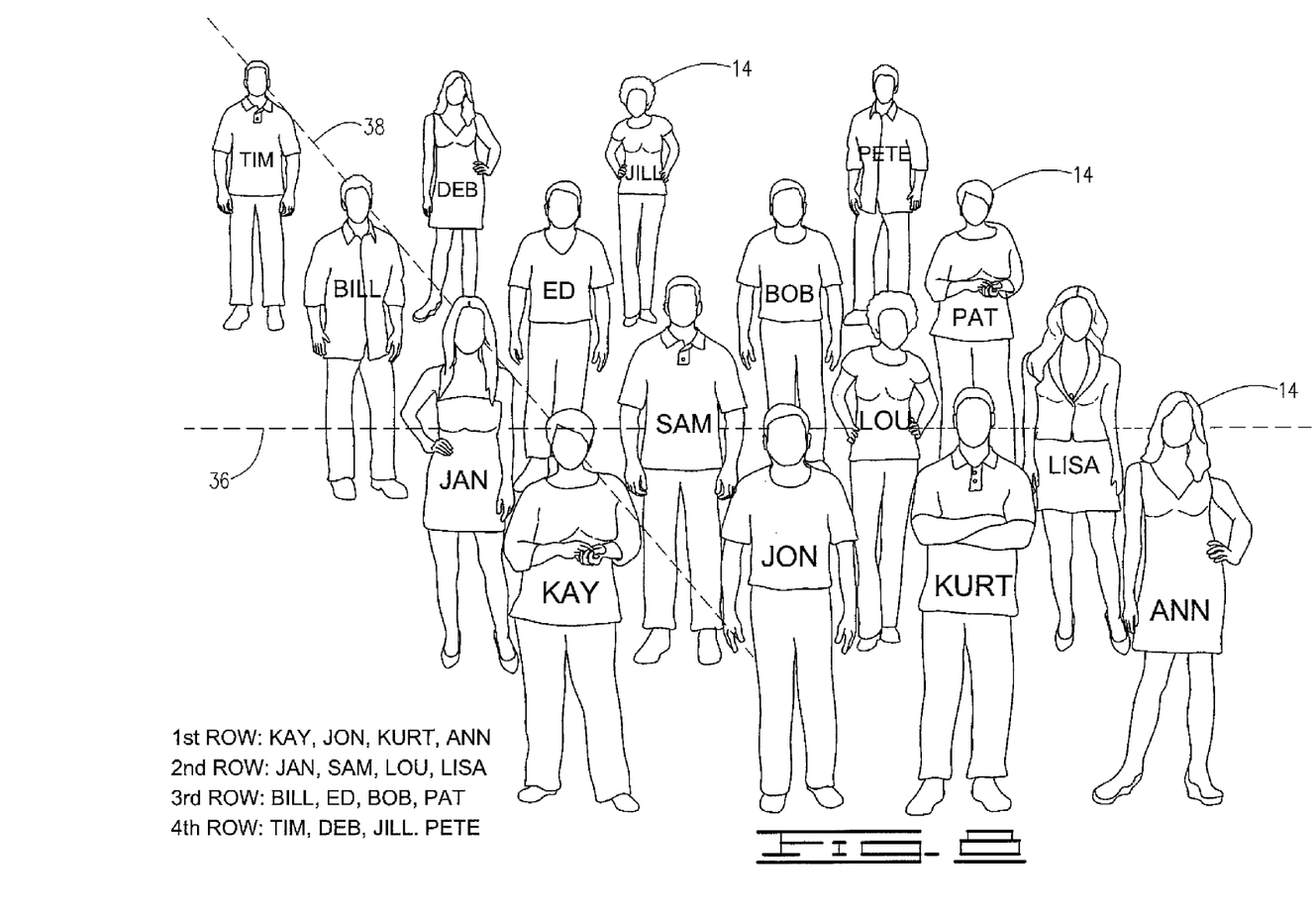

Yet another non-limiting example provides for the ability for subjects 14 to spell words as illustrated in FIG. 6, and as practiced by a marching band. Similarly, another non-limiting example provides for the ability to place subjects 14 about an object 40, as illustrated in FIG. 7. If the operator chooses a free-form approach, the operator is able to select the images or biographical data elements 22 to populate the faux group image in the format artistically desired. Other pre-defined group image styles 32 may be created and stored for use, as well as creating subsets of pre-defined group image styles 32 that allow refined placement of subjects 14.

Step 42 provides for the selection of the digital image 18 and/or biographical data element 22 from database 26. The selection is made by the operator, a representative of subjects 14, and/or each subject 14. Step 42 and step 30 may be accomplished sequentially, contemporaneously, or in reverse order.

Once step 30 and step 42 are accomplished, step 44 provides for the automatic generation of faux group image 46. If desired, faux group image 46 includes at least one biographical data element 22 for each subject 14. As illustrated in FIG. 8, biographical data element 22 includes the name of subject 14, and indicates which position and row 36 they appear in faux group image 46. The operator is able to view biographical data elements 22 on faux group image 46, but may choose to not display biographical data elements 22 on the final faux group image 46.

After faux group image 46 is generated in step 44, if the operator did not have the background selected as part of sample style menu 34, the operator then selects the desired background, and then the operator may finalize faux group image 46, as illustrated in step 48.

Referring to step 47, the operator may optionally select to display biographical data elements 22 on faux group image 46. The display may be manually inputted or automatically generated.

Furthermore, the operator may wish to adjust faux group image 46 by clicking, dragging and moving an individual subject 14 with faux group image 46 to a new position, as illustrated in step 50. Alternatively, the operator may wish to move an individual biographical data element 22 to a new position. In the first instance, digital image 18 of subject 14 is moved to a new position, thereby causing biographical data element 22 linked to subject 14 to move to the new position. The new positions of digital image 18 and biographical data element 22 are relative to the other subjects 14 and their linked biographical data elements 22. In other words, the biographical data elements are positioned in the faux group image relative to each other, and mirror the digital image positions to the other digital images. In the second instance, biographical data element 22 of subject 14 is moved, thereby causing digital image 18 of subject 14 to be moved in faux group image 46. As before, the new positions of digital image 18 and biographical data element 22 are relative to the other subjects 14 and their linked biographical data elements 22. Once the operator has completed step 50, the operator may finalize faux group image 46 in step 48, or the operator may provide subjects 14 the opportunity to provide commentary input and suggested changes to faux group image 46.

The operator has the option of providing step 52, which presents a draft of faux group image 46 for commentary input and suggested changes thereto. Step 52 may directly follow step 44 or step 50. For example, a draft of faux group image 46 is presented for subjects 14, or other customers, to view the image and biographical detail. The presentation may be online, in a store, through a hardcopy, or in any other form. An option the operator may present to subjects 14 or other customers is the option to select a background, if a background has not already been selected. The presentation provides numerous options to subjects 14, customers and the operator. If biographical data elements 22 have errors or have changed, subjects 14 are able to submit corrections and updates. If subject 14 has an alternate digital image on file, subject 14 may suggest using the alternate image. The amount of data, input and control presented to subjects 14 is at the discretion of the operator.

Step 48 is the finalization of faux group image 46. Although step 48 is the final step, the nature of the digital file allows additional efforts. As described herein, the part of the finalization step may include inserting the background. For example, the "customer" may have selected a different background, or a series of backgrounds, for faux group image 46. The "customer" includes subjects 14, representatives of subjects 14, or anyone else desiring faux group image 46.

The steps of the inventive method may be accomplished in several different orders. For example, the customer may establish optional selection of group image style 32 prior to the capturing of the digital image 18. In that case, the selection of group image style (32) may be one of the first steps. Thus, when step 44 is executed, group image style (32) from sample style menu 34 may already be selected.

Figure 4:
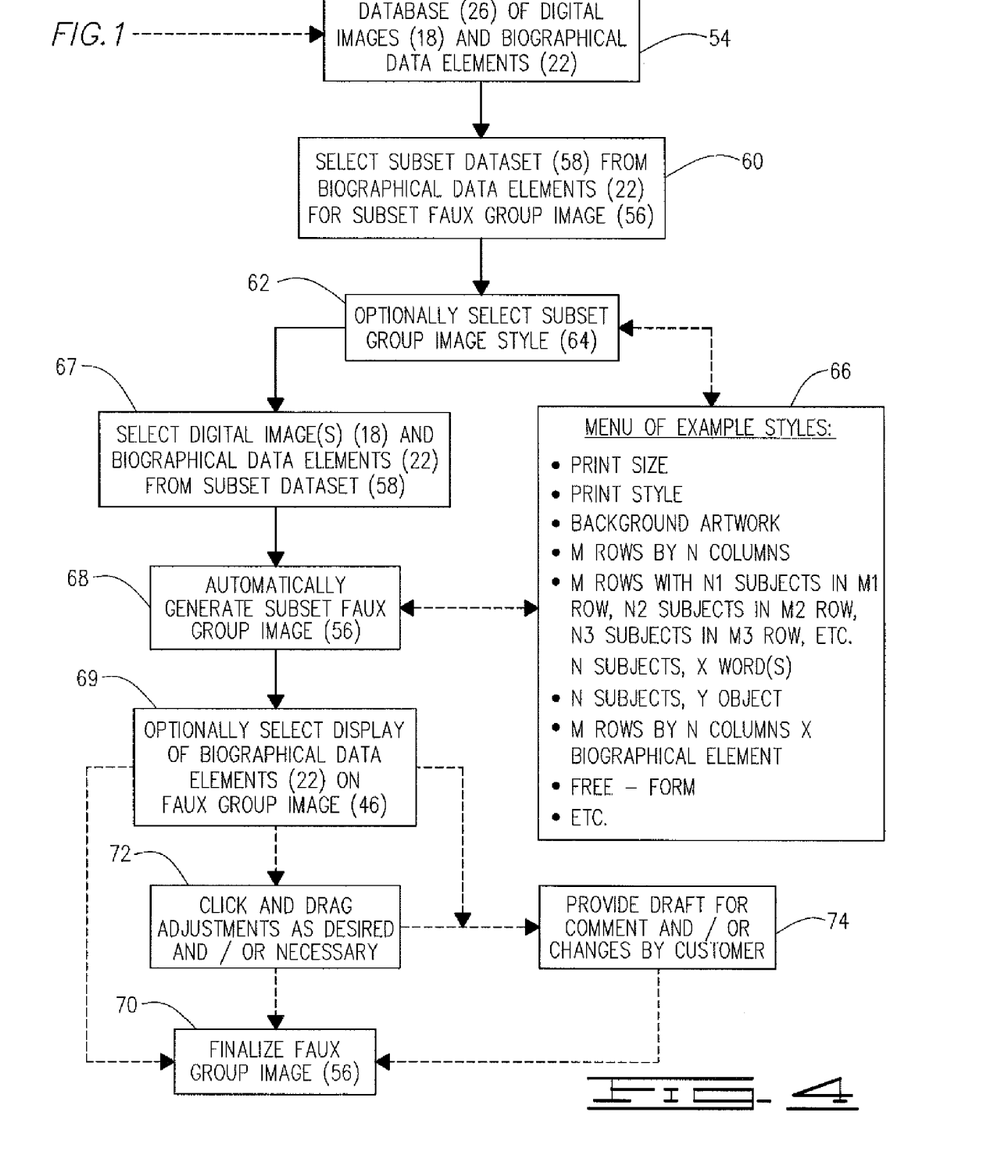
FIG. 4 is a flow chart of the subset faux group using the inventive method.

Referring to FIG. 4, the method to create a subset faux group is illustrated in flowchart 54. Once digital images 18 and biographical data elements 22 are stored in database 26, subset faux group image 56 may be created. Creating subset faux group image 56 is similar to the method described in flowchart 10.

Flowchart 54 begins with the database 26 as illustrated in step 24 of flowchart 10. From database 26, a subset of biographical data elements 22 are selected, thereby forming subset dataset 58 which are used to create subset faux group image 56 in step 60. Some non-limiting examples of the selection of a subset of biographical data elements 22 include social organizations, honor society, graduating class, hometowns, age, gender, military unit, etc. A non-limiting example is a school class image. Once database 26 is created for the school class image, it may be desirable to have subset dataset 58 with all the students who are in the Honor Society. Alternatively, it may be desirable to create subset dataset 58 of only the football team or the band members from database 26. The same concept is used to form a subset dataset 58 of any group that is within database 26.

Once the subset dataset 58 is selected, the method presented in flowchart 10, and described above, is repeated. Step 62 provides for selecting subset group image style 64 that is substantially similar to step 30 for the selection of group image format 32. The selection of subset group image style 64 is made from sample style menu 66. Sample style menu 66 is similar to sample style menu 34.

Step 60 and step 62 may be accomplished sequentially, contemporaneously, or in reverse order of each other. Step 67 is similar to step 42 for selecting digital images 18 and biographical data element 22 from database 26. Step 68 provides for the automatic generation of subset faux group image 56, which is substantially similar to step 44 and the automatic generation of faux group image 46 with a selected background. Step 69 is similar to step 47 for providing the option to display biographical data elements 22 on subset faux group image 56. In step 69, the operator may optionally select to display biographical data elements 22 on subset faux group image 56. The display may be manually inputted or automatically generated.

Step 70 provides for finalizing subset faux group image 56. Step 72 provides for the adjustment of subset faux group image 56 in the same manner as step 50. Step 74 provides for presenting the draft subset faux group image 56 for the customer to potentially select a background, and to potentially provide feedback, updates and corrections thereto, as found in step 52. The format of the updates is presented in various formats. Those formats include a hard copy, an internet site, a store-based computer, a kiosk, a mobile kiosk, a storage disc and combinations thereof.

Just as subset faux group image 56 is able to be created from database 26, a plurality of databases 26 may be combined to create a new, larger database. For example, if a first database 26 is limited to a senior class and a second database 26 is limited to a junior class, the two databases 26 may be combined into a larger school database. From that database, a large faux group image 46 may be created, or a series of subset faux group images 56 may be created.

Digital Image Capture

Preferably, each individual subject 14 or individual object 40 is captured as a separate raw digital image. Digital image 18 is the resulting image from the isolation of subject 14 or object 40 from the raw digital image. Accordingly, the raw digital image of subject 14 or object 40 may require pre-processing to isolate the image of subject 14 or object 40. To minimize the pre-processing, raw digital image of each individual subject 14 or individual object 40 is captured in front of screen 78, where screen 78 is preferably a green screen or blue screen. This approach minimizes the pre-processing effort. However, any background may be used to capture the raw digital image. The amount of pre-processing required to generate digital image 18 is increased when a green screen or blue screen is not used. Methods to remove background from around an image are known to those having skill in the art.

Digital image 18 is captured using any digital device 76. A preferred digital device 76 is a digital camera having at least a 21-megapixel capability. However, a digital camera having less pixels, a digital video camera, a digital video recorder, a digitizing scanner, a smart phone or combinations of these devices will suffice to capture digital image 18. The quality of digital image 18 is degraded with less capable digital devices 76. Preferably, digital devices 76 produce an output in a portable network graphic (PNG) file format. Alternatively, digital device 76 produces an output capable of conversion to a PNG file format. PNG file formats are the preferred file formats for the faux group image method described herein.

Digital image 18 may be captured as a three-dimensional image. A three-dimensional image increases the options for creating faux group image 46, and for recreating different image capture positions relative to subjects 14. For example, FIG. 6 illustrates a plurality of subjects spelling out "GO TEAM." With three-dimensional images, each digital image allows use of angles for off-center images, images slightly above, or any other image the operator can image.

Subject 14 may have multiple digital images 18 made. In that case, the operator, subject 14 or a representative of subject 14 may select the preferred digital image 18. It may be desirable to have multiple digital images 18 taken of subject 14 to represent the various groups for which they are members. For example, a high school student may create a "senior picture" digital image, a band digital image, and an athletic digital image. Each digital image 18 may be used for different faux group images 46 and/or subset faux group images 56, Biographical Data Collection and Linking Biographical data elements 22 and subset dataset 58 include at least a name or descriptive names of each individual subject 14. Descriptions of biographical data elements 22 and subset dataset 58 relate to objects 40 instead of persons. Other biographical data elements 22 may include information such as hometowns, birthdates, individual group affiliations, schools, grades, activities, military units, religion, etc. The foregoing lists are non-exhaustive and non-limiting. The type of biographical data elements 22 and subset dataset 58 may be tailored to the individual subjects 14 and groups.

Once all of digital images 18 and biographical data elements 22 are defined, each digital image 18 of subject 14 and the associated biographical data elements 22 for subject 14 are linked. Linking involves electronically embedding and/or combining digital image 18 with biographical data elements 22 in an electronic file, or database 26. Database 26 stores the linked digital image 18 with biographical data elements 22 as individual datasets. Retrieval of datasets from database 26 is usually accomplished with one element of biographical data elements 22.

Selection of Format

Referring to FIGS. 3, 4 and 6-9, sample style menus 34 and 66 depict a sampling of potential, pre-defined group image formats 32 available to the operator. As described above, the operator has the option of using rows 36 and columns 38, matrices, word images, object-based images, free-form images, or any other pre-defined image the operator chooses to employ. The operator may also combine any of these into a pre-defined group image format 32 or subset group image style 64. The discussion above clearly defines group image formats 32 and the matrix approach with rows 36 and columns 38. In one embodiment, rows 36 and columns 38 create a matrix that can be automatically populated with digital images 18. For example, if the desired positioning in the matrix is alphabetical, then the operator must identify that as the biographical element, and then identify the size of the matrix. From there, faux group image 46 is generated. Similarly, the operator may choose to spell words, as illustrated in FIG. 6, or place object 40 front and center, as illustrated in FIG. 7. In both cases, biographical data elements 22 are selected to identify positioning within faux group image 46 or subset faux group image 56. Use of object 40 within the faux group image 46 or subset faux group image 56 defines an object-based faux group image format 32, or an object-based subset faux group image style 64. The free-form faux group image format 32 or free-form subset faux group image style 64 is a blank canvas for the operator to insert digital images 18 and/or biographical data elements 22 into faux group image 46 or subset faux group image 56, where the operator manually positions subjects 14. Combinations of all the aforementioned methods are also considered. One example includes combining the free-form and object-based faux group formats 32 to move digital images 18 within faux group image 46.

Adjusting

Once faux group image 46, or subset faux group image 56 is generated, the operator may need or want to adjust the subjects within the image. To do so, the operator moves a cursor or other pointing device over subject 14, and then digitally drags subject 14 to a new location. This action automatically updates biographical data elements 22 for the moved subject 14 relative to the other subjects 14 and their associated biographical data elements 22. Alternatively, the operator moves a cursor over biographical data elements 22 for subject 14, and moves biographical data elements 22 to a new location. This action automatically updates the position of subject 14 in faux group image 46 or subset faux group image 56, while adjusting biographical data elements 22 for the moved subject 14 relative to the other subjects 14 and their associated biographical data elements 22. The same functions are repeated for any object 40 positioned and adjusted within faux group image 46 or subset faux group image 56.

Automatic Generation and Finalizing

As part of the automatic generation of faux group image 46 and subset faux group image 56, each subject 14 is proportionally sized relative to the other subjects 14 to replicate the natural effect of depth. The faux group image is automatically generated from the selected digital images, wherein each digital image is automatically proportionally sized relative to the other digital images based upon the position of the digital image within the faux group image. For example, each subject 14 on row 36 is proportionally sized relative to subject 14 immediately in front. The same is true proportional sizing occurs when the subjects are in other configurations. However, in this instance, the proportional sizing is based upon the position of subject 14 as subject 14 appears further back in the image.

Prior to finalizing faux group image 46 and subset faux group image 56, a background is selected upon which faux group image 46 and subset faux group image 56 are superimposed. The desired background can be any background image desired by the operator or the customer purchasing the faux group image. Once the final image is ready with the chosen background, faux group image 46 and subset faux group image 56 are finalized.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A method of creating a faux group image comprising the steps of:

capturing at least one digital image of each of a plurality of subjects;

digitally isolating each subject in each captured digital image to produce a plurality of digitally isolated images;

obtaining at least one biographical data element associated with each subject and linking the biographical data element with the associated digitally isolated image to produce a linked digital image;

electronically storing each linked digital image and biographical data element to create a database of linked digital images;

selecting a group image format;
selecting one or more of the linked digital images from the database;
selecting a background; and
automatically generating the faux group image from the selected linked digital images, wherein each linked digital image is automatically and proportionally sized relative to the other linked digital images based upon the position of the linked digital image within the faux group image so as to replicate the natural effect of depth.

2. The method of claim 1, wherein the step of capturing employs a digital camera.

3. The method of claim 1, wherein the step of capturing employs a digital device selected from the group consisting of a digital camera, a digitizing scanner, a digital video recorder, a digital video camera, a smart phone and combinations thereof.

4. The method of claim 1, wherein the step of obtaining the biographical data element further comprises data selected from the group consisting of names, addresses, home town, school, relationship to a person, relationship to an entity, relationship to an organization, relationship to an event, organizational affiliation, date, location of image capture and combinations thereof; and wherein the step of selecting one or more of the linked digital images from said database further comprises using said biographical data element to select the linked digital images.

5. The method of claim 1, wherein the step of selecting the group image format further comprises selecting a pre-defined group image format.

6. The method of claim 5, wherein the pre-defined group image format is selected from the group consisting of matrices, free-form, object-based, word images and combinations thereof.

7. The method of claim 5, wherein the pre-defined group image format is a matrix comprising a plurality of rows.

8. The method of claim 7, further comprising an operator selecting the number of rows for the matrix and selecting the number of linked digital images in each row.

9. The method of claim 7, further comprising the step of presenting to an operator at least one automatically generated suggested number of rows for the matrix and an automatically generated suggested number of linked digital images in each row, wherein the operator subsequently selects the number of rows and the number of linked digital images in each row.

10. The method of claim 5, further comprising the step of modifying the automatically generated faux group image, wherein the operator electronically selects and moves at least one linked digital image within the pre-defined group image format.

11. The method of claim 10, further comprising the step of automatically displaying at least one biographical data element for each linked digital image in the automatically generated faux group image, wherein the thus displayed biographical data elements are positioned in the faux group image relative to each other, such that the thus displayed biographical data elements mirror the linked digital image positions relative to the other linked digital images.

12. The method of claim 11, wherein the movement of each linked digital image in the automatically generated faux group image automatically repositions the associated displayed biographical data element.

13. The method of claim 1, further comprising the step of automatically displaying at least one biographical data element for each linked digital image in the automatically generated faux group image.

14. The method of claim 13, further comprising the step of modifying the automatically generated faux group image, wherein an operator electronically selects and moves at least one linked digital image, wherein the movement of each linked digital image automatically repositions the associated displayed biographical data element.

15. The method of claim 1, further comprising the step of modifying the automatically generated faux group image, wherein an operator electronically selects and moves at least one linked digital image within the faux group image, thereby creating a new faux group image.

16. The method of claim 15, further comprising the step of automatically displaying at least one biographical data element for each linked digital image in the automatically generated faux group image.

17. The method of claim 16, wherein the movement of each linked digital image automatically repositions the associated displayed biographical data element.

18. The method of claim 1, wherein the biographical data element for each subject is displayed on the automatically generated faux group image.

19. The method of claim 1, further comprising the step of selecting a focal point for the plurality of subjects, wherein the step of automatically generating the group image provides for positioning of the subjects about the focal point.

20. The method of claim 1, wherein the step of selecting the digital images further comprises having each subject select their preferred linked digital image and provide necessary updates to the biographical data elements.

21. The method of claim 1, wherein the step of selecting the linked digital images further comprises having a group representative select their preferred linked digital image for each subject and provide necessary updates to the biographical data elements for the subjects.

22. The method of claim 1, further comprising creating a subset of the linked digital images in the database based upon at least one biographical data element an using said subset to create a subset faux group image.

23. The method of claim 1 wherein a series of faux group images are generated by selecting different subsets of the linked digital images in the database.

24. The method of claim 1 wherein there are at least two captured digital images used to produce the plurality of digitally isolated images.

25. A method of creating a faux group image comprising the steps of:
obtaining at least one biographical data element associated with each of a plurality of individual subjects;
capturing at least one digital image of each of the individual;
digitally isolating each subject in each captured digital image to thus produce a digitally isolated image for each subject;
linking each digitally isolated image with the biographical data element associated with the subject in the digitally isolated image to produce a linked digital image for each subject;
electronically storing each linked digital image and its biographical data element to create a database of linked digital images;
selecting a desired group image format;
automatically positioning the linked digital image of one or more of the individual subjects in the desired group image format using the biographical data element of the linked digital image;
selecting a background; and
automatically creating the faux group image.

26. The method of claim 25, further comprising the step of automatically and proportionally sizing each linked digital image relative to the other linked digital images based upon the position of the linked digital image within the faux group image so as to replicate the natural effect of depth.

27. The method of claim 25, further comprising the step of displaying at least one biographical data element on the faux group image, wherein the biographical data element display is associated with the linked digital image position in the faux group image.

28. The method of claim 25, wherein the step of digitally isolating each subject further comprises the step of editing the scanned images, wherein the editing digitally removes all traces of the scanned image except for the individual subject.

29. The method of claim 25, wherein the step of capturing employs a digital device selected from the group consisting of a digital camera, a digitizing scanner, a digital video recorder, a digital video camera, a smart phone and combinations thereof.

30. The method of claim 29, wherein the digital device produces an output in a portable network graphic file format.

31. The method of claim 29, wherein the digital device produces an output capable of being converted to a portable network graphic file format.

32. The method of claim 25, wherein the step of obtaining biographical data elements further comprises data selected from the group consisting of names, addresses, home town, school, relationship to a person, relationship to an entity, relationship to an organization, relationship to an event, organizational affiliation, date, location of image capture and combinations thereof; and wherein the step of automatically positioning the linked digital image of one or more of the individual subjects further comprises using said biographical data element to select the linked digital images to be positioned.

33. The method of claim 25, wherein the desired group image format is selected from the group consisting of matrices, free-form, object-based, word images and combinations thereof.

34. The method of claim 25, wherein the desired group image format is a matrix comprising a plurality of rows and each linked digital image is automatically and proportionally sized relative to the other linked digital images based upon the row where the linked digital image is positioned so as to replicate the natural effect of depth.

35. The method of claim 34, further comprising an operator selecting the number of rows for the matrix and selecting the number of linked digital images in each row.

36. The method of claim 25, further comprising the step of modifying the automatically generated faux group image, wherein an operator electronically selects and moves at least one linked digital image within the desired group image format.

37. The method of claim 36, further comprising the step of automatically displaying at least one biographical data element for each linked digital image in the automatically generated faux group image, wherein the thus displayed biographical data elements are positioned in the faux group image relative to each other, and the thus displayed biographical data mirror the linked digital image positions relative to the other linked digital images.

38. The method of claim 36, wherein the movement of each linked digital image in the automatically generated faux group image automatically repositions the associated biographical data element.

39. The method of claim 25, further comprising the step of automatically displaying at least one biographical data element for each linked digital image in the automatically generated faux group image.

40. The method of claim 25 wherein a series of faux group images are generated by selecting different subsets of the linked digital images in the database.

41. A method of creating a faux group image comprising the steps of:
capturing at least one digital image of each of a plurality of subjects;
digitally isolating each subject in each captured digital image to thus produce a digitally isolated image for each subject;
obtaining at least one biographical data element associated with each subject and linking that biographical data element with the associated digitally isolated image and thus producing a linked digital image for each subject;
electronically storing each linked digital image and its biographical data element to create a database of linked digital images;
selecting a background;
selecting one or more linked digital images from the database;
automatically generating the faux group image from the selected linked digital images; and
providing access to each subject for selection of their preferred digital image and entry of any necessary corrections to the associated biographical data elements.

42. The method of claim 41, further comprising the step of automatically and proportionally sizing each linked digital image relative to the other linked digital images based upon the position of the digital image within the faux group image so as to replicate the natural effect of depth.

43. The method of claim 41, further comprising the step of displaying at least one biographical data element on the faux group image, wherein the biographical data element display is associated with the linked digital image position in the faux group image.

44. The method of claim 41, further comprising the step of selecting a group image format and generating the faux group image within that format.

45. The method of claim 44, wherein the desired group image format is selected from the group consisting of matrices, free-form, object-based, word images and combinations thereof.

46. The method of claim 41, wherein the step of obtaining biographical data elements further comprises data selected from the group consisting of names, addresses, home town, school, relationship to a person, relationship to an entity, relationship to an organization, relationship to an event, organizational affiliation, date, location of image capture and combinations thereof; and wherein the step of selecting one or more of the linked digital images from said database further comprises using said biographical data element to select the linked digital images.

47. The method of claim 41, wherein the step of capturing employs a digital camera.

48. The method of claim 41, wherein the step of capturing employs a digital device selected from the group consisting of a digital camera, a digitizing scanner, a digital video recorder, a digital video camera, a smart phone and combinations thereof.

49. The method of claim 48, wherein the digital device produces an output in a portable network graphic file format.

50. The method of claim 48, wherein the digital device produces an output capable of being converted to a portable network graphic file format.

51. The method of claim 41, wherein the step of capturing employs a digital scanner capturing at least one scanned image from at least one existing image.

52. The method of claim 51, wherein the step of digitally isolating each subject further comprises the step of editing the scanned images, wherein the editing digitally removes all traces of the scanned image except for the individual subject.

53. The method of claim 41, wherein the providing access step further comprises presenting the faux group image and associated biographical data elements in one of the formats selected from the group consisting of a hard copy, an internet site, a store-based computer, a kiosk, a mobile kiosk, a storage disc and combinations thereof.

54. The method of claim 41 wherein a series of faux group images are generated by selecting different subsets of the linked digital images in the database.

\* \* \* \* \*